United States Patent
He et al.

(10) Patent No.: US 9,509,698 B2
(45) Date of Patent: Nov. 29, 2016

(54) METHOD OF ESTABLISHING A TRUST RELATIONSHIP FOR SHARING RESOURCES BETWEEN TWO TENANTS IN A CLOUD NETWORK

(71) Applicant: Orange, Paris (FR)

(72) Inventors: Ruan He, Issy les Moulineaux (FR); Xiangjun Qian, Ruijin (CN)

(73) Assignee: Orange, Paris (FR)

(*) Notice: Subject to any disclaimer, the term of this patent is extended or adjusted under 35 U.S.C. 154(b) by 0 days.

(21) Appl. No.: 14/561,099

(22) Filed: Dec. 4, 2014

(65) Prior Publication Data

US 2015/0163225 A1    Jun. 11, 2015

(30) Foreign Application Priority Data

Dec. 5, 2013 (FR) ..................... 13 62132

(51) Int. Cl.
| | |
|---|---|
| H04L 29/06 | (2006.01) |
| H04L 12/911 | (2013.01) |
| G06F 21/62 | (2013.01) |
| G06F 21/60 | (2013.01) |

(52) U.S. Cl.
CPC ............ *H04L 63/10* (2013.01); *G06F 21/604* (2013.01); *G06F 21/6218* (2013.01); *H04L 47/70* (2013.01); *H04L 63/08* (2013.01)

(58) Field of Classification Search
CPC ....... H04L 63/10; H04L 63/08; H04L 47/70; G06F 21/6218; G06F 21/604
See application file for complete search history.

(56) References Cited

U.S. PATENT DOCUMENTS

| | | | | |
|---|---|---|---|---|
| 6,460,141 B1* | 10/2002 | Olden | ................... | G06F 21/604 726/12 |
| 8,166,071 B1* | 4/2012 | Korablev | ............. | G06F 21/604 707/783 |
| 9,065,836 B1* | 6/2015 | Frank | .................... | H04L 63/104 |
| 9,077,728 B1* | 7/2015 | Hart | ...................... | H04L 63/104 |
| 2002/0026592 A1* | 2/2002 | Gavrila | ............... | G06F 21/6218 726/6 |
| 2004/0193606 A1* | 9/2004 | Arai | ..................... | G06F 21/6218 |
| 2006/0173869 A1* | 8/2006 | Byrne | ................ | G06F 21/6218 |
| 2006/0230281 A1* | 10/2006 | Hofmann | ........... | G06F 21/6218 713/182 |
| 2007/0174031 A1* | 7/2007 | Levenshteyn | ....... | G06F 21/6218 703/13 |
| 2008/0082540 A1* | 4/2008 | Weissman | .......... | G06F 21/6227 |
| 2008/0127310 A1* | 5/2008 | Robbins | ............. | G06F 21/6245 726/4 |
| 2008/0162483 A1* | 7/2008 | Becker | ............. | G06F 17/30575 |

(Continued)

OTHER PUBLICATIONS

El Kalam, et al., "Organization Based Access Control." IEEE Proceedings of the 4th International Workshop on Policies for Distributed Systems and Networks (Policy'03) 0-7695-1933-4/03, 12 pages.

(Continued)

*Primary Examiner* — Darren B Schwartz
(74) *Attorney, Agent, or Firm* — Knobbe Martens Olson & Bear LLP (57) ABSTRACT

One embodiment disclosed herein serves to establish a trust relationship for sharing resources between a trustee tenant and a trustor tenant in a cloud network. It comprises receiving a requirement file (REQ) from the trustee tenant said file including at least one permission desired by the tenant, searching for and identifying at least one opportunity file sent by a trustor tenant, this file including at least the permissions, and storing information representative of a trust relationship for sharing resources between the tenants.

10 Claims, 2 Drawing Sheets

(56) References Cited

U.S. PATENT DOCUMENTS

| | | | | |
|---|---|---|---|---|
| 2008/0168532 | A1* | 7/2008 | Carter | G06Q 10/06 726/1 |
| 2008/0184336 | A1* | 7/2008 | Sarukkai | G06F 21/6218 726/1 |
| 2008/0282354 | A1* | 11/2008 | Wobber | G06F 21/6218 726/26 |
| 2008/0313716 | A1* | 12/2008 | Park | H04L 63/104 726/4 |
| 2009/0320093 | A1* | 12/2009 | Glazier | G06F 8/10 726/1 |
| 2010/0063959 | A1* | 3/2010 | Doshi | G06F 17/30575 707/618 |
| 2010/0306818 | A1* | 12/2010 | Li | G06F 17/3092 726/1 |
| 2011/0106802 | A1* | 5/2011 | Pinkney | G06F 17/30085 707/737 |
| 2012/0246738 | A1* | 9/2012 | Shah | G06F 21/6218 726/28 |
| 2012/0284776 | A1* | 11/2012 | Sundaram | G06F 21/6218 726/4 |
| 2013/0232546 | A1* | 9/2013 | Shimono | G06F 21/41 726/3 |
| 2014/0013398 | A1* | 1/2014 | Hotti | H04L 63/10 726/4 |
| 2014/0109168 | A1* | 4/2014 | Ashley | G06F 21/552 726/1 |
| 2014/0298483 | A1* | 10/2014 | Kato | H04L 63/10 726/27 |
| 2014/0351288 | A1* | 11/2014 | Donze | G06F 17/3007 707/783 |
| 2016/0112429 | A1* | 4/2016 | Sundaresan | H04L 63/08 726/4 |

OTHER PUBLICATIONS

International Telecommunication Union (ITU). Feb. 2012. "FG Cloud TR Version 1.0—Part 1: Introduction to the cloud ecosystem: definitions, taxonomies, use cases, and high-level requirements," 69 pages.

Sandhu, et al. 1996. "Role-Based Access Control Models." IEEE Computer, 29(2):38-47.

Tang, et al. May 2013. Multi-Tenancy Authorization Models for Collaborative Cloud Services. IEEE Journal in Collaboration Technologies and Systems (CTS), pp. 132-138, No. 978-1-4673-6404-1/13.

French Search Report dated Aug. 14, 2014 for French Application No. 1362132 filed Dec. 5, 2013, 1 page.

* cited by examiner

METHOD OF ESTABLISHING A TRUST RELATIONSHIP FOR SHARING RESOURCES BETWEEN TWO TENANTS IN A CLOUD NETWORK

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57 in their entireties. In particular, the disclosure of French Application 1362132, filed on Dec. 5, 2013, is incorporated by reference herein in its entirety.

BACKGROUND OF THE INVENTION

One embodiment disclosed herein relates to the general field of telecommunications, and in particular to so-called "cloud computing" systems.

Some embodiments relate more particularly to a user accessing computer resources made available to that user by a cloud computing system.

According to the definition given by the National Institute of Standards and Technology (NIST), "cloud computing" is a model enabling users to have self-service access on demand, via a network, to computer resources and networks such as storage space, computation power, applications, software, or indeed services, which are virtualized (i.e. made virtual) and shared.

In other words, the computer resources and networks are not located on a local server of an entity or on a user station, but in accordance with the concept of cloud computing they are "dematerialized" in a "cloud" made up of a plurality of remote servers that are mutually interconnected and accessible to users via a network application. Users can thus have varying access to those resources, without needing to manage the underlying infrastructure for these resources, which infrastructure is often complex.

The concept of "cloud computing" is described in greater detail in the document published by the International Telecommunication Union (ITU) entitled "FG Cloud TR version 1.0—Part 1: introduction to the cloud ecosystem: definitions, taxonomies, use cases, and high-level requirements", February 2012.

In known manner, "cloud computing" benefits from numerous advantages:

flexibility and diversity of resources, which are shared and practically unlimited;

scalability of resources, which are supplied on demand;

simple and automatic administration of business computer infrastructures and networks, and a reduction in administration costs;

etc.

Nevertheless, a major challenge with the "cloud computing" concept is to guarantee protection and security for access to resources.

Specifically, changing from a secure and closed conventional computer environment to an infrastructure in an open and shared cloud over which the user or the business has no control and which is accessible via a telecommunications network such as the public Internet (which is itself particularly vulnerable and is continuously being subjected to attacks and computer piracy), raises concerns with potential users in terms of security.

Thus, in the opinion of the ITU, access control is nowadays fundamental for securing access to cloud computer systems.

Numerous mechanisms exist in the present state of the art for controlling (and making secure) access to computer systems (or in equivalent manner, to information systems) of entities or organizations such as businesses.

Those mechanisms are based essentially on two elements, namely:

defining a policy in terms of access rights that are formulated using a subject-object-action approach, i.e. such-and-such a subject does or does not have permission to perform such-and-such an action on such-and-such an object; and implementing this policy on receiving a request from a user seeking to access the resources made available by the computer system, by checking on the user's access rights to those resources.

By way of example, such mechanisms are the role-based access control (RBAC) model or the organization-based access control (OrBAC) model as described respectively in the following documents: R-S. Sandhu et al., "Role-Based Access Control Models", IEEE Computer 29(2), pp. 38-47, 1996; and A. Abou El Kalam et al., "Organization Based Access Control", 4th IEEE International Workshop on Policies for Distributed Systems and Networks, 2003.

The OrBAC model relies on an organization concept, and serves to model a variety of security policies defined for and by the organization in order to access its resources.

Thus, more precisely, the OrBAC model introduces the concepts of roles, activities, and views in order to be able to define a security policy associated with an organization, where:

a role is a set of subjects to which the same security rules are applied;

an activity is a set of actions to which the same security rules are applied; and a view is a set of objects to which the same security rules are applied.

The Internet Engineering Task Force (IETF) has defined an extensible access control markup language (XACML) reference architecture that can be used by the OrBAC model for implementing access control in information systems. In known manner, this XACML architecture is based on five types of functional block, namely:

a block for applying an access control policy, known as a policy enforcement point (PEP);

a block for making a decision about access, known as a policy decision point (PDP);

a directory containing access control policies, known as a policy repository;

a block for managing information associated with access policies, known as a policy information point (PIP); and a block for administering access policies, known as a policy administration point (PAP), which specifies and manages access policies.

Some embodiments described herein lie more particularly in the context of "multi-tenant" cloud systems in which a single instance of a cloud computer system is shared by a plurality of client organizations (referred to as "tenants").

A tenant can thus be defined as an indivisible container having allocated thereto a set of users and a virtual share of resources. In practice, a tenant may serve to model a business, a service of a business, or a project.

At present, in most multi-tenant cloud systems, the resources of each of the tenants are partitioned into domains that are independent and watertight, each tenant managing its own access control policy independently.

Unfortunately, that design prevents cooperation between different tenants.

In order to remedy that problem, several tenant collaboration models have been proposed.

In particular, the document "Multi-Tenancy Authorization Models for Collaborative Cloud Services" by Bo Tang, Ravi Shandu, and Qi Li published in May 2013 in the IEEE Journal in Collaboration Technologies and Systems (CTS), pp. 132-138 no 978-1-4673-1/13 describes a system derived from the RBAC model for establishing a trust relationship between two tenants in a cloud system.

In general manner, a trust relationship may be defined as an access control mechanism defined between two entities in order to enable those entities to share resources in regulated manner.

A trust relationship thus breaks a tenant's isolation in controlled manner, the tenants remaining isolated from one another in principle, except when trust relationships are established between the tenants enabling them to share certain resources, under certain conditions.

Known methods of establishing associated trust and access control relationships present a certain number of problems. Specifically, those methods:

require a resource-discovery mechanism to be put into place in the cloud system in order to enable each tenant to have an overall view of the cloud so as to enable any one tenant to identify another tenant with which to establish a trust relationship;

do not enable a trust relationship to be established between two tenants in automatic manner.

Some embodiments disclosed herein propose a mechanism for establishing trust relationships between tenants in a cloud network that does not present those drawbacks.

OBJECT AND SUMMARY OF THE INVENTION

Thus, and in a first aspect, a method of establishing a trust relationship for sharing resources between a trustee tenant and a trustor tenant in a cloud network is provided. One embodiment of the method comprises:

receiving a requirement file from the trustee tenant, this file including at least one permission desired by the tenant;

searching for at least one opportunity file sent by a trustor tenant, this file including at least the above-mentioned permissions; and storing information representative of a trust relationship for sharing resources between the tenants.

Correspondingly, one embodiment disclosed herein provides a module for establishing a trust relationship for sharing resources between a trustee tenant and a trustor tenant in a cloud network, the module comprising:

a module which receives a requirement file from the trustee tenant, this file including at least one permission desired by the tenant;

a module which searches for and identifies at least one opportunity file sent by a trustor tenant, this file including at least the above-mentioned permissions; and a module which stores information representative of a trust relationship for sharing resources between the tenants.

In most advantageous manner, the trust relationship between the trustor tenant and the trustee tenant is established automatically without the tenants having an overall view of the cloud system.

One embodiment disclosed herein also provides the method of controlling access to a resource of a first tenant by a second tenant in a cloud network, the method comprising:

receiving from the second tenant a request to benefit from a permission to access said resource;

verifying that the first tenant includes a role that offers this permission and that a trust relationship for sharing resources has been established between the first tenant and the second tenant; and authorizing or denying said access as a function of the result of the verification step.

Correspondingly, one embodiment disclosed herein provides a system for controlling access to a resource of a first tenant by a second tenant in a cloud network, the system comprising:

a reception module which receives from the second tenant a request to benefit from a permission to access the resource;

a module which verifies that the first tenant includes a role that offers this permission and that a trust relationship for sharing resources has been established between the first tenant and the second tenant; and a module which authorizes or denies said access as a function of the result of the verification step.

In a preferred implementation, one embodiment disclosed herein relies on the RBAC model based on roles in a multi-tenant cloud system.

In this embodiment, the method of establishing a trust relationship of the invention includes:

creating at least one virtual role in the namespace of the trustee tenant, the virtual role pointing towards a role of the namespace of the trustor tenant, the role including the above-mentioned permission.

By creating such virtual roles, the trust relationship thus enables a tenant to use one or more roles of another tenant.

In this embodiment, the access control method comprises:

identifying a virtual role of the second tenant; and the verification process comprises determining that this virtual role of the second tenant points to the role of the first tenant that offers the permission that is being sought by the second tenant.

Correspondingly, in this embodiment, the system comprises:

a module which identifies a virtual role of the second tenant;

the verification module being suitable for determining that this virtual role of the second tenant points to the role of the first tenant that offers the permission that is being sought by the second tenant.

In a particular embodiment of the system of the invention:

the reception module includes a block PEP suitable for applying an access control policy;

the module for authorizing or denying access includes a block PDP suitable for taking a decision concerning access control;

said module for identifying a virtual role of the second tenant comprises a block PDP and a block PIP;

the blocks PEP, PDP, and PIP complying with the extensible access control markup language (XACML) reference architecture used by the OrBAC model.

In a particular implementation, the various steps of the method of establishing a trust relationship and/or of the access control method are determined by computer program instructions.

Consequently, one embodiment disclosed herein also provides a computer program on a data medium, the program being capable of being performed by a computer, the program including instructions adapted to performing the method of establishing a trust relationship and/or the access control method as described above.

The program may use any programming language, and it may be in the form of source code, object code, or code intermediate between source code and object code, such as in a partially compiled form, or in any other desirable form.

One embodiment disclosed herein also provides a computer readable data medium, including instructions of a computer program as mentioned above.

The data medium may be any entity or device capable of storing the program. For example, the medium may comprise storage means such as a read only memory (ROM), for example a compact disk (CD) ROM or a microelectronic circuit ROM, or indeed magnetic recording means, e.g. a floppy disk or a hard disk.

Furthermore, the data medium may be a transmissible medium such as an electrical or optical signal that can be conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the invention appear in the light of the following description made with reference to the accompanying drawings, in which.

DETAILED DESCRIPTION OF AN IMPLEMENTATION

Figure 1:
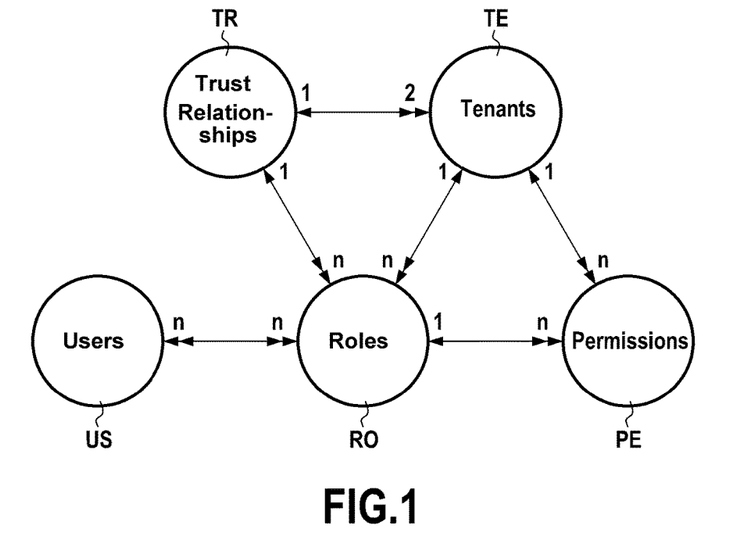
FIG. 1 shows a trust model in accordance with an implementation of the invention.

FIG. 1 shows a trust model in accordance with an implementation of the invention.

This trust model is based on the RBAC model that is known to the person skilled in the art. It comprises in particular:

a "Roles" entity RO describing roles in the meaning of the RBAC model. It should be recalled that a role represents a set of users having common access rights, and that a role offers one or more permissions.

a "Permissions" entity PE describing permissions, each permission being associated with one or more roles.

a "Users" entity US describing users, each user having one or more roles, which roles may be described for example as a function of a level of responsibility or of qualification; this association makes it possible to define the access rights enjoyed by a user.

a "Tenants" entity TE describing the tenants, each tenant being associated with a set of roles and with a set of permissions.

The trust model of the invention further includes a "trust relationship" entity TR, where a trust relationship enables a tenant known as a "trustee" to benefit from one or more roles of a tenant known as a "trustor".

Figure 2:
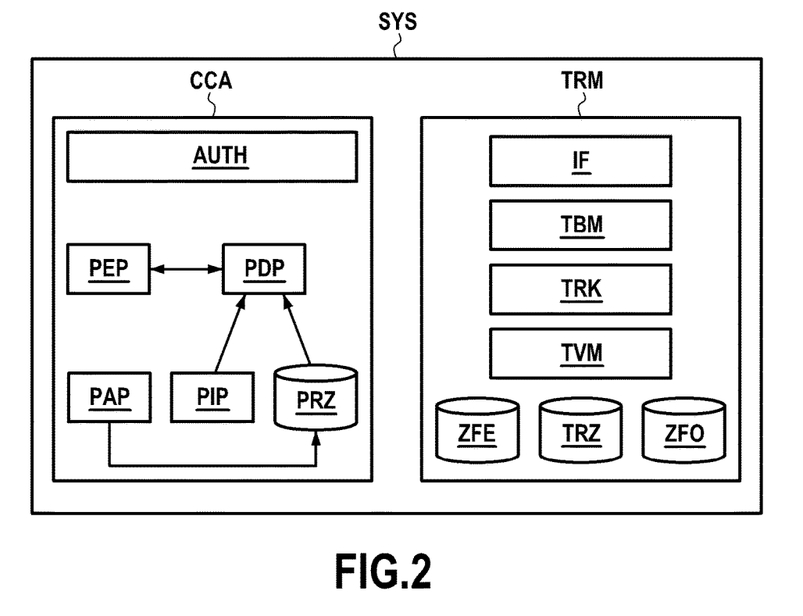
FIG. 2 shows an access control system in accordance with the invention, the system enabling the trust model of FIG. 1 to be implemented.

FIG. 2 shows an access control system SYS in accordance with the invention, the system enabling the trust model of FIG. 1 to be performed.

This system mainly comprises access control components CCA in accordance with the XACML reference architecture (in accordance with the invention, respective tenants use their own access control components CCA) and a single centralized manager of trust relationships, also known as a trust reference monitor (TRM), in accordance with the invention.

In this example, the access control components are:

an authentication module AUTH.

a policy storage zone PRZ, known as a "policy repository", in which the policies of the various tenants are stored.

an access control block, known as a "policy enforcement point" (PEP), suitable for sending a request in XACML format to the block PDP as defined below for permission to receive a decision to authorize or to deny an access decision, and to apply that decision;

a "policy decision point" block PDP suitable for acting on reception of an XACML request for permission issued by the block PEP to apply the applicable policy to determine whether permission should be authorized or denied, and to deliver accordingly a decision to authorize or to deny permission to the block PEP. When the attribute values needed by the block PDP in order to take its decision are not present in the XACML request, the block PDP can interrogate the block PIP as defined below in order to obtain them.

a "policy information point" block PIP that is suitable, on request from the block PDP, for providing it with attribute values when they are not present in the XACML request sent to the block PDP by the block PEP.

a "policy administration point" block PAP having the main function of creating and managing the policies of various tenants.

In this embodiment, the trust relationship manager TRM of the invention comprises:

an interface IF that is accessible by the administrators of the various tenants to specify "requirements" and "opportunities" as defined below.

a "trust builder" module TBM for establishing a trust relationship and suitable for comparing or reconciling the various requirements and opportunities of the various tenants, and in the event of compatibility, suitable for establishing a trust relationship between a trustor tenant and a trustee tenant and for storing this trust relationship in a trust repository zone TRZ.

a "trust revocator" module TRK suitable for breaking a trust relationship that has already been established between two tenants when a revocation condition becomes true.

a "trust verifier" module TVM suitable for determining whether a first tenant can access resources of a second tenant as a function of the trust relationships that have been established between those two tenants.

the above-mentioned trust repository zone TRZ storing the trust relationships between the various tenants.

In accordance with one embodiment, the requirements and opportunities are formalized in computer-usable "requirement files" and in "opportunity files".

More precisely, a requirement file is a file in which the administrator of a tenant specifies the permissions needed or required of a tenant in order to render a particular service. This requirement file represents the desire of the tenant to access the resources of another tenant.

In the presently-described implementation, the requirement file of one tenant may also describe preconditions required for establishing a trust relationship with another tenant. These preconditions may be of any kind, and in particular they may be of a technical or a commercial nature.

In the presently-described implementation, the requirement file of one tenant may also describe conditions required for revoking a trust relationship already established with another tenant.

An example of a requirement file is given in Appendix A. In this example, the file comprises:

a set of required permissions, specifically permission for read access to a file example_file_1 and write access to a file example_file_2;

a set of conditions for revoking a trust relationship established with another tenant. In this example, the only condition is receiving a notification sent by the administrator of the tenant.

In the example of Appendix A, no preconditions are specified for establishing a trust relationship with another tenant.

Similarly, an opportunity file is a computer-usable document in which the administrator of a tenant specifies the roles made available to other tenants, with a role corresponding to a set of permissions.

In the presently-described implementation, an opportunity file may also contain conditions associated with the offer.

An example opportunity file is given in Appendix B. In this example, the file comprises:

a set of permissions on offer, specifically permission for read access to a file example_file_1 and write access to a file example_file_2;

a set of conditions for revoking a trust relationship established between this tenant and another tenant. In this example, the only condition is receiving a notification sent by the administrator of the tenant.

In the presently-described implementation, the requirement files and the opportunity files are stored respectively in a requirement file storage zone ZFE and in an opportunity file storage zone ZFO.

In the presently-described implementation, the requirement files and of the opportunity files are in the XML language. In a variant, it would also be possible to use an ontology language, e.g. the language OWL.

Figure 3:
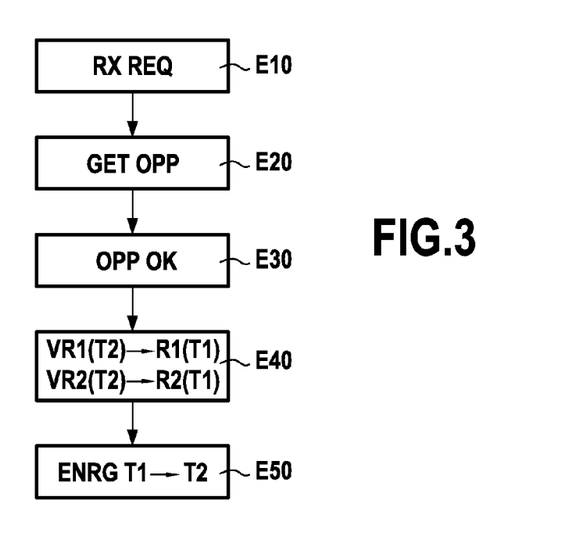
FIG. 3 shows a flowchart giving the main steps of a method of setting up a trust relationship in accordance with a particular implementation of the invention.

With reference to FIG. 3, there follows a description of a method of establishing a trust relationship between a trustor tenant T1 and a trustee tenant T2.

In this example, the administrator of the trustor T1 uses the interface IF of the trust relationship manager TRM to provide an opportunity file OPP containing a set of roles {r1, r2, r3} without any conditions. In this example:

the role r1 has two permissions {p1, p2};
the role r2 has two permissions {p3, p4}; and
the role r3 has two permissions {p5, p6}.

In this example, the administrator of the trustee T2 uses the interface IF of the trust relationship manager TRM to provide a requirement file REQ requesting a set of permissions {p1, p2, p3} without any conditions. This file includes a single condition for revoking the trust relationship: namely receiving a notification message sent by the tenant T2.

The method is performed by the trust builder module TBM.

It comprises a first step E10 during which the trust builder module TBM receives the requirement file REQ from the tenant T2.

During a step E20, the module TBM searches the opportunity file zone ZFO for an opportunity file OPP compatible with the requirement file REQ, in other words having opportunities that correspond to the requirements in the file REQ.

During a step E30, the module TBM identifies that the opportunity file OPP of the tenant T1 satisfies these conditions, the roles r1, r2 including in particular the permissions p1, p2, p3 required by the tenant T2.

During a step E40, the trust builder module TBM creates two virtual roles vr1, vr2 in the namespace of the trustee tenant T2, each of these virtual roles vr1, vr2 pointing to the corresponding role r1, r2 of the trustor tenant T1. This avoids conflict between the namespaces of the two tenants T1 and T2.

The virtual roles vr1, vr2 of the trustee T2 are thus visible to the blocs PDP and PIP in T2 when they consult the policy of the tenant T2 in the policy repository zone PRZ.

The module TB stores the trust relationship established between T1 and T2 together with the links between the virtual roles vr1, vr2 of T1 and the roles r1, r2 of T2 in the trust relationship storage zone TRZ during a step E50.

Figure 4:
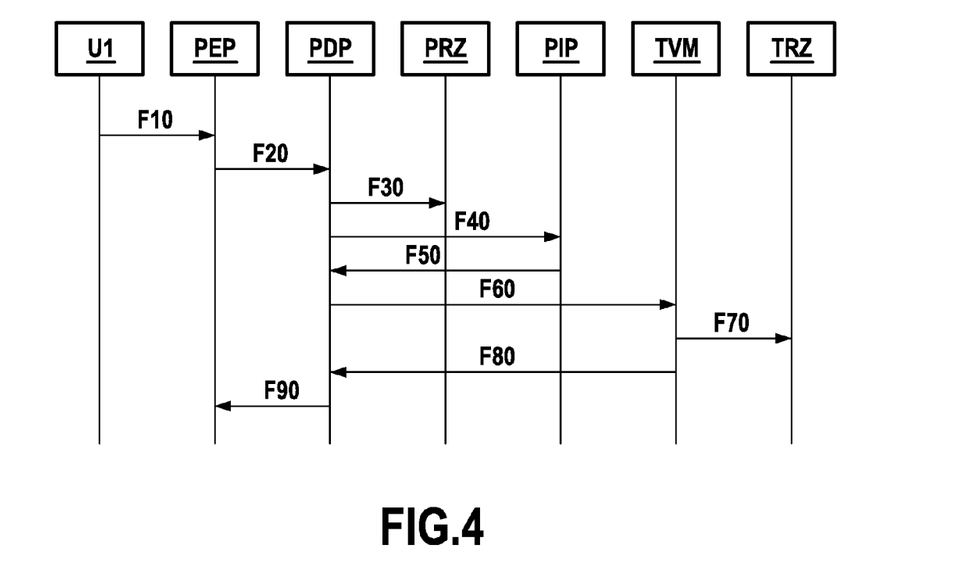
FIG. 4 shows a flowchart giving the main steps of a method of controlling access in accordance with a particular implementation of the invention.

With reference to FIG. 4, there follows a description of the main steps of an access control method in accordance with the invention.

It is assumed that a trust relationship has been established between the trustor tenant T1 and the trustee tenant at T2, and that a virtual role vr1 of the tenant T2 points to a role r1 of the tenant T1.

During a step F10, the user U1 of the tenant T2 sends a request to the policy enforcement point PEP or access control block of T2 in order to benefit from the permission p1.

During a step F20, the block PEP sends an XACML request to the policy decision point module PDP of T2 to inform it whether or not the tenant T2 can benefit from the permission p1.

During a step F30, the block PDP of T2 consults the policy repository zone PRZ of T2 and identifies the virtual role vr1 of the user U1.

The block PDP of T2 consults the module PIP of T2 in order to obtain additional information (steps F40 and F50). It thus discovers that the role vr1 is a virtual role.

During a step F60, the block PDP of T2 interrogates the module TVM of the single centralized trust relationship manager TRM so that it can verify the trust relationships enjoyed by the trustee T2.

During a step F70, the module TVM consults the trust relationship storage zone TRZ and determines that the virtual role vr1 of the tenant T2 is pointing to the role r1 of the tenant T1, and that this role r1 provides the permission p1.

During a step F80, the module TVM informs the block PDP of T2 that the tenant T2 can use the permission p1.

During a step F90, the block PDP of T2 sends a positive response to the block PDP of T2 to inform it that the tenant T2 can use the permission p1.

In the presently-described implementation, the trust relationship between the tenants T1 and T2 authorizing the tenant T2 to use the resource p1 remains in force so long as the administrator of T2 does not send a revocation request for this purpose to the revocation request module TRK.

In the presently-described implementation, when the trust revocation module TRK receives such a request, it destroys the virtual roles vr1, vr2 of T2 together with the trust relationship between the tenants T1 and T2 in the zone TRZ.

APPENDIX A

```
<id>requirement_doc_1</id>
<tenant>example_tenant</tenant>
<Required PermissionList>
<RequiredPermission>(read, example_file_1)</RequiredPermission>
<RequiredPermission>(write, example_file_2)</RequiredPermission>
</Required PermissionList>
<ConditionList>
<Condition>No_Condition</Condition>
</ConditionList>
<Revocation>Notified_by_Tenant</Revocation>
```

APPENDIX B

```
<id>opportunity_doc_1</id>
<tenant>example_tenant</tenant>
<OfferedRoleList>
<OfferedRole>
<RoleID>Data_Analyzer</RoleID>
<Permission>(read, example_file_1)</Permission>
<Permission>(write, example_file_2)</Permission>
<OfferedRole>
</OfferedRoleList>
<ConditionList>
<Condition>No_Condition</Condition>
</ConditionList>
```

What is claimed is:

1. A method of sharing resources between a trustee tenant in a cloud network and a trustor tenant in the cloud network, the method comprising:
   receiving, by a trust builder module, a requirement file from the trustee tenant in the cloud network, said requirement file including at least one permission desired by said trustee tenant in the cloud network;
   searching, by the trust builder module, a storage zone for at least one opportunity file sent by the trustor tenant in the cloud network, said at least one opportunity file including said at least one permission; and
   storing, by the trust builder module, information representative of a trust relationship for sharing resources between said trustee and trustor tenants in the cloud network;
   receiving, by a reception module, from the trustee tenant in the cloud network a request to benefit from a permission to access a resource;
   identifying, by an identification module, a virtual role of the trustee tenant in the cloud network;
   verifying, by a verification module, that the trustor tenant in the cloud network includes a role that offers said permission and that the trust relationship for sharing resources has been established between the trustor tenant in the cloud network and the trustee tenant in the cloud network, said verification comprising determining that said virtual role of the trustee tenant in the cloud network points to said role of the trustor tenant in the cloud network; and
   authorizing or denying, by an access control module, said access as a function of whether it is determined during said verification that the trustor tenant in the cloud network includes the role that offers said permission and that the trust relationship for sharing resources has been established between the trustor tenant in the cloud network and the trustee tenant in the cloud network.

2. The method of claim 1, further comprising:
   creating, by the trust builder module, at least one virtual role in a namespace of the trustee tenant in the cloud network, said at least one virtual role pointing towards a corresponding role of a namespace of the trustor tenant in the cloud network including said at least one permission.

3. A cloud network for sharing resources between a trustee tenant and a trustor tenant in a cloud network, the cloud network comprising:
   a reception module which receives a requirement file from the trustee tenant in the cloud network, said requirement file including at least one permission desired by the trustee tenant in the cloud network;
   a search module which searches for at least one opportunity file sent by a trustor tenant in the cloud network, said at least one opportunity file including said at least one permission;
   a storage module which stores information representative of a trust relationship for sharing resources between the trustee tenant in the cloud network and the trustor tenant in the cloud network;
   a reception module which receives from the trustee tenant in the cloud network a request to benefit from a permission to access a resource;
   an identification module which identifies a virtual role of the trustee tenant in the cloud network;
   a verification module which verifies that the trustor tenant in the cloud network includes a role that offers said permission and that the trust relationship for sharing resources has been established between the trustor tenant in the cloud network and the trustee tenant in the cloud network, said verification comprising determining that said virtual role of the trustee tenant in the cloud network points to said role of the trustor tenant in the cloud network; and
   an access control module which authorizes or denies said access as a function of whether it is determined during said verification that the trustor tenant in the cloud network includes the role that offers said permission and that the trust relationship for sharing resources has been established between the trustor tenant in the cloud network and the trustee tenant in the cloud network.

4. A computer system for controlling access to a resource of a trustor tenant in a cloud network by a trustee tenant in the cloud network, the system comprising:
   a reception module which receives from the trustee tenant in the cloud network a request to benefit from a permission to access the resource;
   an identification module which identifies a virtual role of the trustee tenant in the cloud network;
   a verification module which verifies that the trustor tenant in the cloud network includes a role that offers said permission and that a trust relationship for sharing resources has been established between the trustor tenant in the cloud network and the trustee tenant in the cloud network, said verification module being suitable for determining that said virtual role of the trustee tenant in the cloud network points to said role of the trustor tenant in the cloud network; and
   an access control module which authorizes or denies said access as a function of whether it is determined during said verification that the trustor tenant in the cloud network includes the role that offers said permission and that the trust relationship for sharing resources has been established between the trustor tenant in the cloud network and the trustee tenant in the cloud network; wherein:
   said reception module includes a policy enforcement point (PEP) block suitable for applying an access control policy;

said access control module includes a policy decision point (PDP) block suitable for taking a decision concerning access control; and said blocks PEP and PDP comply with an extensible access control markup language reference architecture as used by an organization-based access control (OrBAC) model.

5. The computer system according to claim 4, wherein:

said identification module includes a block PDP and a block policy information block (PIP), said blocks PDP and PIP complying with the extensible access control markup language reference architecture as used by the OrBAC model.

6. A computer having stored thereon a program including instructions for performing a method for sharing resources between a trustee tenant in a cloud network and a trustor tenant in the cloud network when said program is executed by said computer, the method comprising:

receiving, by a trust builder module, a requirement file from the trustee tenant in the cloud network, said requirement file including at least one permission desired by said trustee tenant;

searching, by the trust builder module, a storage zone for at least one opportunity file sent by the trustor tenant in the cloud network, said at least one opportunity file including said at least one permission;

storing, by the trust builder module, information representative of a trust relationship for sharing resources between said trustee and trustor tenants in the cloud network;

receiving, by a reception module, from the trustee tenant in the cloud network a request to benefit from a permission to access a resource;

identifying, by an identification module, a virtual role of the trustee tenant in the cloud network;

verifying, by a verification module, that the trustor tenant in the cloud network includes a role that offers said permission and that the trust relationship for sharing resources has been established between the trustor tenant in the cloud network and the trustee tenant in the cloud network, said verification comprising determining that said virtual role of the trustee tenant in the cloud network points to said role of the trustor tenant in the cloud network; and authorizing or denying, by an access control module, said access as a function of whether it is determined during said verification that the trustor tenant in the cloud network includes the role that offers said permission and that the trust relationship for sharing resources has been established between the trustor tenant in the cloud network and the trustee tenant in the cloud network.

7. The computer of claim 6, wherein the instructions further comprise instructions for creating at least one virtual role in a namespace of the trustee tenant in the cloud network, said at least one virtual role pointing towards a corresponding role of a namespace of the trustor tenant in the cloud network including said at least one permission when said instructions are executed by said computer.

8. A non-transitory computer-readable data medium having stored thereon a computer program comprising instructions for sharing resources between a trustee tenant in a cloud network and a trustor tenant in the cloud network when said instructions are executed by a computer, the method comprising:

receiving, by a trust builder module, a requirement file from the trustee tenant in the cloud network, said requirement file including at least one permission desired by said trustee tenant in the cloud network;

searching, by the trust builder module, a storage zone for at least one opportunity file sent by the trustor tenant in the cloud network, said at least one opportunity file including said at least one permission; and storing, by the trust builder module, information representative of a trust relationship for sharing resources between said trustee and trustor tenants in the cloud network;

receiving, by a reception module, from the trustee tenant in the cloud network a request to benefit from a permission to access a resource;

identifying, by an identification module, a virtual role of the trustee tenant in the cloud network;

verifying, by a verification module, that the trustor tenant in the cloud network includes a role that offers said permission and that the trust relationship for sharing resources has been established between the trustor tenant in the cloud network and the trustee tenant in the cloud network, said verification comprising determining that said virtual role of the trustee tenant in the cloud network points to said role of the trustor tenant in the cloud network; and authorizing or denying, by an access control module, said access as a function of whether it is determined during said verification that the trustor tenant in the cloud network includes the role that offers said permission and that the trust relationship for sharing resources has been established between the trustor tenant in the cloud network and the trustee tenant in the cloud network.

9. The non-transitory computer-readable data medium of claim 8, wherein the instructions further comprise instructions for creating, by the trust builder module, at least one virtual role in a namespace of the trustee tenant in the cloud network, said at least one virtual role pointing towards a corresponding role of a namespace of the trustor tenant in the cloud network including said at least one permission when said instructions are executed by said computer.

10. A method for controlling access to a resource of a trustor tenant in a cloud network by a trustee tenant in the cloud network, the method comprising:

receiving, by a reception module, from the trustee tenant in the cloud network a request to benefit from a permission to access the resource;

identifying, by an identification module, a virtual role of the trustee tenant in the cloud network;

verifying, by a verification module, that the trustor tenant in the cloud network includes a role that offers said permission and that a trust relationship for sharing resources has been established between the trustor tenant in the cloud network and the trustee tenant in the cloud network, said verification module being suitable for determining that said virtual role of the trustee tenant in the cloud network points to said role of the trustor tenant in the cloud network; and authorizing or denying, by an access control module, said access as a function of whether it is determined during said verification that the trustor tenant in the cloud network includes the role that offers said permission and that the trust relationship for sharing resources has been established between the trustor tenant in the cloud network and the trustee tenant in the cloud network; wherein:

said reception module includes a policy enforcement point (PEP) block suitable for applying an access control policy;

said access control module includes a policy decision point (PDP) block suitable for taking a decision concerning access control; and said blocks PEP and PDP comply with an extensible access control markup language reference architecture as used by an organization-based access control (Or-BAC) model.

* * * * *